United States Patent
Takami et al.

(10) Patent No.: US 6,468,693 B1
(45) Date of Patent: Oct. 22, 2002

(54) NONAQUEOUS ELECTROLYTE SECONDARY BATTERY

(75) Inventors: Norio Takami; Takahisa Ohsaki, both of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/628,279

(22) Filed: Jul. 28, 2000

(30) Foreign Application Priority Data

Jul. 29, 1999 (JP) ............................................ 11-215319

(51) Int. Cl.$^7$ ................................................ H01M 2/04
(52) U.S. Cl. ................. 429/176; 429/231.1; 429/231.3; 429/231.8; 429/223; 429/337; 429/330
(58) Field of Search .............................. 429/176, 231.1, 429/223, 231.3, 231.8, 337, 330

(56) References Cited

U.S. PATENT DOCUMENTS

| | | | | |
|---|---|---|---|---|
| 4,719,159 A | * | 1/1988 | Clark et al. | 429/177 |
| 5,134,046 A | * | 7/1992 | Chow et al. | 429/176 |
| RE34,991 E | * | 7/1995 | Yoshino et al. | 429/194 |
| 5,783,333 A | * | 7/1998 | Mayer | 429/223 |

FOREIGN PATENT DOCUMENTS

| | | |
|---|---|---|
| JP | 7-142093 * | 6/1995 |
| JP | 10-172606 | 6/1998 |
| JP | 10-177865 | 6/1998 |
| JP | 10-189054 | 7/1998 |

OTHER PUBLICATIONS

C. Delmas, et al., Journal of Power Sources, pp. 595–602, "The Cycling Properties of the $Li_xNi_{1-y}Co_yO_2$ Electrode", 1993.

Tsutomu Ohzuku, et al., J. Electrochem. Soc., vol. 142, No. 12, pp. 4033–4039, "Synthesis and Characterization of $LiAl_{1/4}Ni_{3/4}O_2$ (R3m) for Lithium–Ion (Shuttlecock) Batteries", Dec. 1995.

* cited by examiner

*Primary Examiner*—Laura Weiner
(74) *Attorney, Agent, or Firm*—Oblon, Spivak, McClelland, Maier & Neustadt, P.C.

(57) ABSTRACT

The present invention provides a nonaqueous electrolyte secondary battery, comprising a jacket having a wall thickness not larger than 0.25 mm, a positive electrode housed in the jacket and containing a positive electrode active material, a negative electrode housed in the jacket and containing a negative electrode active material, and a nonaqueous electrolyte housed in the jacket, wherein the positive electrode active material comprises at least one kind of oxide selected from the group consisting of an oxide containing an element M, Li and Ni and an oxide containing an element M, Li, Ni and Co, the element M being at least one element selected from the group consisting of Al, B, Sn and Nb, and the pH of the positive electrode active material falls within a range of between 10 and 12.

21 Claims, 1 Drawing Sheet

NONAQUEOUS ELECTROLYTE SECONDARY BATTERY

CROSS-REFERENCE TO RELATED APPLICATIONS

This application is based upon and claims the benefit of priority from the prior Japanese Patent Application No. 11-215319, filed Jul. 29, 1999, the entire contents of which are incorporated herein by reference.

BACKGROUND OF THE INVENTION

The present invention relates to a nonaqueous electrolyte secondary battery.

Presently, a thin lithium ion secondary battery is put on the market as a nonaqueous electrolyte secondary battery for portable apparatuses such as a portable telephone. The thin lithium ion secondary battery comprises a positive electrode containing lithium cobalt oxide ($LiCoO_2$), a negative electrode containing a graphitized material or a carbonized material, a separator interposed between the positive electrode and the negative electrode and consisting of a porous membrane, a liquid nonaqueous electrolyte prepared by dissolving a lithium salt in an organic solvent, and a jacket consisting of a cylindrical or rectangular can.

With progress in miniaturization and thinning of the portable apparatus, it is required that the secondary battery be made thinner and lighter in weight. However, it is somewhat difficult to realize a secondary battery of the construction described above having a thickness not larger than 4 mm.

Under the circumstances, proposed is a nonaqueous electrolyte secondary battery comprising an electrode group including a positive electrode, a negative electrode, and a polymer electrolyte layer interposed between the positive electrode and the negative electrode, and a jacket consisting of a laminate film having a thickness not larger than 0.25 mm, and the particular nonaqueous electrolyte secondary battery is being vigorously developed. In the secondary battery provided with the polymer electrolyte layer, the bonding strength between the electrode and the electrolyte layer can be ensured even if the thickness of the jacket is decreased.

On the other hand, various ideas are being proposed in an attempt to decrease the thickness of a nonaqueous electrolyte secondary battery provided with a liquid nonaqueous electrolyte. For example, a lithium ion secondary battery comprising a positive electrode, a negative electrode, a separator having mutually facing surfaces holding a liquid electrolyte, and an adhesive resin layer consisting of a high molecular weight gel phase and a high molecular weight solid phase containing a liquid electrolyte and a liquid electrolyte and the adhesive resin layer serving to permit the positive electrode and the negative electrode to be bonded to the mutually facing surfaces of the separator is proposed in Japanese Patent Disclosure (Kokai) No. 10-177865.

On the other hand, Japanese Patent Disclosure No. 10-189054 discloses a method of manufacturing a liquid ion secondary battery, comprising the steps of preparing a positive electrode by forming a positive electrode active material layer on a positive electrode current collector and a negative electrode by forming a negative electrode active material layer on a negative electrode current collector; preparing a solution of a binder resin consisting essentially of polyvinylidene fluoride by dissolving polyvinylidene fluoride in a solvent and coating a separator with the binder resin solution; preparing a battery laminate body by arranging the positive electrode on one surface of the separator and the negative electrode on the other surface of the separator, followed by drying the resultant laminate structure so as to evaporate the solvent; and impregnating the battery laminate body with a liquid electrolyte.

It is also proposed in Japanese Patent Disclosure No. 10-172606 that an adhesive resin layer is arranged between a positive electrode prepared by bonding a positive electrode active material layer to a current collector and a separator and between a negative electrode prepared by bonding a negative electrode active material layer to a current collector and the separator. It is taught that, in this case, the bonding strength between the positive electrode active material layer and the separator is made equal to or higher than the bonding strength between the positive electrode active material layer and the current collector. It is also taught that the bonding strength between the negative electrode active material layer and the separator is made equal to or higher than the bonding strength between the negative electrode active material layer and the current collector.

In each of the lithium ion secondary batteries disclosed in the prior arts described above, it is possible to ensure a sufficiently high bonding strength between the positive electrode and the separator and between the negative electrode and the separator, even if the thickness of the jacket is decreased. In addition, since it is possible to use a liquid nonaqueous electrolyte, it is possible to increase the volume energy density and the large current discharge characteristics, compared with the secondary battery utilizing a polymer electrolyte.

Incidentally, in an attempt to further increase the capacity of the nonaqueous electrolyte secondary battery, it is being studied to use lithium nickel complex oxide ($Li_xNiO_2$) in place of lithium cobalt complex oxide ($Li_xCoO_2$) that was widely used in the past as a positive electrode active material. For example, Japanese Patent Disclosure No. 63-121258 discloses lithium nickel complex compounds having a heterogeneous element such as Al, Sn, In, B, P, or Si introduced therein. Also, a lithium nickel cobalt complex oxide ($Li_xNi_{1-y}Co_yO_2$) is disclosed in J. Power Sources, 43–44, 595 (1993). Further, it is described in J. Electrochem. Soc., 142, 4033 (1995) that a lithium nickel oxide having aluminum introduced therein exhibits a relatively high thermal stability.

However, the nonaqueous electrolyte secondary battery comprising a positive electrode containing the lithium nickel complex oxide or the lithium nickel cobalt complex oxide described above as an active material and a jacket having a wall thickness not larger than 0.25 mm, which certainly permits improving the capacity, is inferior in its safety.

To be more specific, where the jacket has a wall thickness not larger than 0.25 mm, the phenomenon such as gas generation or temperature elevation within the secondary battery tends to bring about an accident such as deformation of the battery, gas spurting or ignition, compared with the case where the wall thickness exceeds 0.25 mm. Therefore, in the secondary battery comprising a jacket having a wall thickness not larger than 0.25 mm, it is necessary to suppress the gas generation and temperature elevation within the battery as much as possible. However, since the lithium nickel complex oxide and the lithium nickel cobalt complex oxide noted above are inferior to the lithium cobalt complex oxide in the thermal stability, an oxygen gas is generated if the temperature within the battery is rapidly elevated to 80°

C. to 100° C. because of, for example, short-circuiting within the battery. The oxygen gas thus generated reacts with the organic solvent contained in the nonaqueous electrolyte so as to bring about an oxidizing decomposition of the nonaqueous electrolyte. As a result, the battery temperature is further elevated so as to cause a gas to be spurted from within the battery or to cause a danger of ignition.

BRIEF SUMMARY OF THE INVENTION

An object of the present invention is to improve both the capacity and safety of a nonaqueous electrolyte secondary battery comprising a jacket made of a thin sheet material.

According to a first aspect of the present invention, there is provided a nonaqueous electrolyte secondary battery, comprising a jacket having a wall thickness not larger than 0.25 mm, a positive electrode housed in the jacket and containing a positive electrode active material, a negative electrode housed in the jacket and containing a negative electrode active material, and a nonaqueous electrolyte housed in the jacket, wherein the positive electrode active material comprises at least one kind of oxide selected from the group consisting of an oxide containing an element M, Li and Ni and an oxide containing an element M, Li, Ni and Co, the element M being at least one element selected from the group consisting of Al, B, Sn and Nb, and the pH of the positive electrode active material falls within a range of between 10 and 12.

According to a second aspect of the present invention, there is provided a nonaqueous electrolyte secondary battery, comprising a jacket having a wall thickness not larger than 0.25 mm, a positive electrode housed in the jacket and containing a positive electrode active material, a negative electrode housed in the jacket and containing a negative electrode active material, and a nonaqueous electrolyte housed in the jacket and containing a nonaqueous solvent and a solute dissolved in the nonaqueous solvent, wherein the positive electrode active material comprises at least one kind of oxide selected from the group consisting of an oxide containing an element M, Li and Ni and an oxide containing an element M, Li, Ni and Co, the element M being at least one element selected from the group consisting of Al, B, Sn and Nb, and the nonaqueous solvent contains at least 50% by volume of γ-butyrolactone.

According to a third aspect of the present invention, there is provided a nonaqueous electrolyte secondary battery, comprising a jacket having a wall thickness not larger than 0.25 mm, a positive electrode housed in the jacket and containing a positive electrode active material, a negative electrode housed in the jacket and containing at least one kind of carbon material selected from the group consisting of a fibrous carbon material, a spherical carbon material and a granular carbon material and a nonaqueous electrolyte housed in the jacket and containing a nonaqueous solvent and a solute dissolved in the nonaqueous solvent, Wherein the positive electrode active material comprises at least one kind of oxide selected from the group consisting of an oxide containing an element M, Li and Ni and an oxide containing an element M, Li, Ni and Co, the element M being at least one element M selected from the group consisting of Al, B, Sn and Nb, and the nonaqueous solvent containing at least 50% by volume of γ-butyrolactone.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
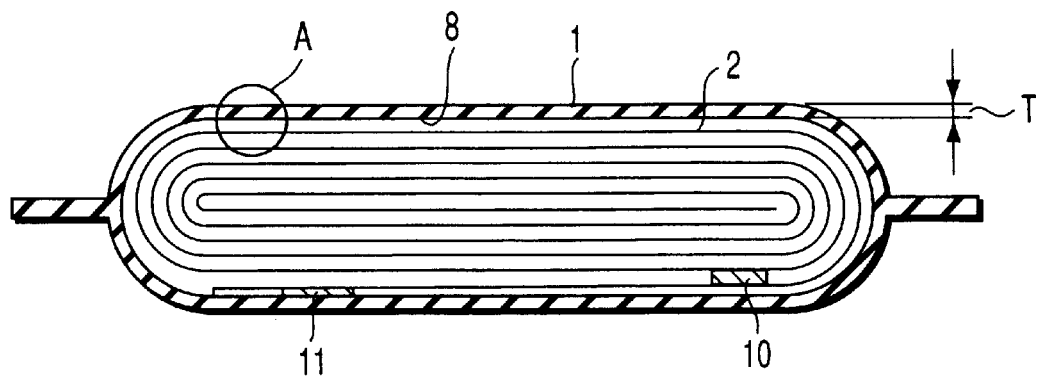
FIG. 1 is a cross sectional view exemplifying a nonaqueous electrolyte secondary battery according to one embodiment of the present invention.

The nonaqueous electrolyte secondary battery of the present invention comprises a jacket having a wall thickness not larger than 0.25 mm, a positive electrode housed in the jacket and containing a positive electrode active material, a negative electrode housed in the jacket and containing a negative electrode active material absorbing and desorbing lithium ions, and a nonaqueous electrolyte housed in the jacket.

The positive electrode active material consists of a first oxide containing an element M, Li and Ni, the element M being at least one element selected from the group consisting of Al, B, Sn and Nb, or a second oxide containing the element M, Li, Ni and Co.

The positive electrode, the negative electrode, the nonaqueous electrolyte, and the jacket used in the present invention will now be described.

1) Positive Electrode

The positive electrode comprises a current collector and a positive electrode layer formed one or both surfaces of the current collector and containing a positive electrode active material.

The positive electrode active material can be said to be a compound (complex oxide) in which the element M is introduced into a part of the crystal structure of the lithium nickel complex oxide or the lithium nickel cobalt complex oxide.

Aluminum is the most preferred element M in each of the first oxide and the second oxide. In the secondary battery containing an oxide, which contains Al as the element M, as the positive electrode active material, the charge-discharge efficiency of the positive electrode and the safety of the secondary batter are improved.

Where the atomic ratio of Ni is set at 1 in the first oxide noted above, it is desirable for the atomic ratio M to fall within a range of between 0.005 and 0.2. If the atomic ratio of the element M is less than 0.005, the thermal stability of the positive electrode active material tends to be lowered, making it difficult to avoid the swelling of the jacket and ignition in the event of the short-circuiting. On the other hand, where the atomic ratio of the element M exceeds 0.2, a high battery capacity is unlikely to be obtained. Also, it is desirable to use Al and/or B as the element M and to set the atomic ratio of the element M to fall within a range of between 0.02 and 0.15. Where these conditions are satisfied, it is possible to further improve the thermal stability of the positive electrode active material and the battery capacity.

It is desirable for the first oxide to have a composition represented by formula (1) given below because the first oxide of the particular composition permits improving the battery capacity:

$$Li_aNi_{1-b}M_bO_2 \quad (1)$$

where M is at least one element selected from the group consisting of Al, B, Sn and Nb, and the atomic ratios a and b should be: $0 < a \leq 1.2$; $0.004 \leq b \leq 0.17$.

The atomic ratio a of Li in formula (1) above is changed within a range between a value larger than 0 and 1.2 depending on the charging capacity and the discharge capacity of the nonaqueous electrolyte secondary battery.

The atomic ratio b of the element M should preferably fall within a range of between 0.01 and 0.12. Most preferably, Al and/or B should be used as the element M and the atomic ratio b should fall within a range of between 0.02 and 0.1.

Where the sum of the atomic ratio of Ni and the atomic ratio of Co is set at 1 in the second oxide, it is desirable for the atomic ratio of the element M to fall within a range of between 0.005 and 0.2. If the atomic ratio of the element M smaller than 0.005, the thermal stability of the positive electrode active material tends to be lowered, making it difficult to avoid the swelling of the jacket and ignition in the event of the short-circuiting. On the other hand, where the atomic ratio of the element M exceeds 0.2, a high battery capacity is unlikely to be obtained. Also, it is desirable to use Al and/or Nb as the element M and to set the atomic ratio of the element M to fall within a range of between 0.02 and 0.15. Where these conditions are satisfied, it is possible to improve the thermal stability of the positive electrode active material and the battery capacity.

It is desirable for the second oxide to have a composition represented by formula (2) given below because the oxide of the particular composition permits improving the battery capacity:

$$Li_xNi_{1-y-z}Co_zM_yO_2 \quad (2)$$

where M is at least one element selected from the group consisting of Al, B, Sn and Nb, and the atomic ratios x, y, and z should be: $0 < x \leq 1.2$; $0.004 \leq y \leq 0.17$; and $0 < z \leq 0.3$.

The atomic ratio x of Li in formula (2) is changed within a range between a value larger than 0 and 1.2 depending on the charging capacity and the discharge capacity of the nonaqueous electrolyte secondary battery.

The atomic ratio y of the element M should fall preferably within a range of between 0.01 and 0.12. Most preferably, Al and/or Nb should be used as the element M, and the atomic ratio y should fall within a range of between 0.02 and 0.1.

It is desirable for the molar ratio z of cobalt to be higher than 0 and not more than 0.3. Where cobalt is contained in the oxide, the thermal stability of the positive electrode active material can be improved, leading to a further improvement in the safety of the secondary battery. However, if the molar ratio z of cobalt exceeds 0.3, the characteristics of the oxide are rendered close to those of the lithium cobalt oxide so as to make it difficult to obtain a high battery capacity. More preferably, the molar ratio z should fall within a range of between a value larger than 0 and 0.25. Most preferably, the molar ratio z should fall within a range of between 0.1 and 0.25.

It is desirable for the positive electrode active material to have a pH value (powder pH value) falling within a range of between 10 and 12. It should be noted that each of the first oxide and the second oxide is synthesized from raw material compounds containing a lithium compound. As a result, lithium salts such as lithium carbonate and lithium oxide, i.e., alkali components, remain as unreacted materials or impurities. If each of these oxides is washed with water, the alkali components remaining within the oxides are removed so as to diminish the pH value. In this case, however, these oxides are decomposed. On the other hand, if the pH value exceeds 12, the residual alkali component within the first oxide and the second oxide tends to react easily with the non-aqueous solvent of the nonaqueous electrolyte, with the result that carbon dioxide gas tends to be generated in a large amount. More preferably, the pH value should fall within a range of between 10.5 and 11.8.

The first oxide and the second oxide can be synthesized by, for example, a solid phase method, a coprecipitation method, or a hydrothermal synthesis method.

The positive electrode can be prepared by, for example, suspending a positive electrode active material, a conducting agent and a binder in a suitable solvent, followed by coating a current collector with the suspension and subsequently drying and pressing the coating to form a positive electrode.

The binder used in the present invention, which serves to bond the powdery particles or grains contained in the positive electrode layer, includes, for example, polytetrafluoroethylene (PTFE), polyvinylidene fluoride (PVdF), ethylene-propylenediene copolymer (EPDM) and styrene-butadiene rubber (SBR). Particular, it is desirable to use a thermosetting resin as the binder. To be more specific, it is desirable to use PVdF as the binder.

The conducting agent used in the present invention includes, for example, acetylene black, carbon black and graphite.

The mixing ratio of the positive electrode active material, the conducting agent and the binder should desirably be 80 to 95% by weight for the positive electrode active material, 3 to 20% by weight for the conducting agent, and 2 to 7% by weight for the binder.

A porous conductive substrate or a non-porous conductive substrate can be used as the current collector. These conductive substrates can be formed of, for example, aluminum, stainless steel, or nickel. It is desirable for the thickness of the current collector to be 5 to 20 μm. Where the thickness of the current collector falls within the range noted above, the requirements for the high mechanical strength and the lightweight of the electrode can be achieved in good balance.

It is desirable for one positive electrode layer to have a thickness of 10 to 150 μm. Therefore, where the positive electrode layers are formed on both surfaces of the current collector, the sum of the thicknesses of electrode layers should desirably be 20 to 300 μm. The thickness of one positive electrode layer should more desirably be 30 to 100 μm. Where the thickness of the positive electrode layer falls within the range specified in the present invention, it is possible to improve the large current discharge characteristics and the cycle life of the secondary battery.

It is possible for the positive electrode to contain an adhesive polymer for achieving bonding between the positive electrode and the separator. It is desirable for the polymer exhibiting an adhesivity to be capable of maintaining a high adhesivity under the state of holding the liquid nonaqueous electrolyte. It is more desirable for the polymer to exhibit a high lithium ion conductivity. To be more specific, the polymer used in the present invention includes, for example, polyacrylonitrile (PAN), polyacrylate (PMMA), polyvinylidene fluoride (PVdF), polyvinyl chloride (PVC) and polyethyleneoxide (PEO). Particularly, it is desirable to use polyvinylidene fluoride (PVdF) as the polymer. It should be noted that polyvinylidene fluoride (PVdF), which is capable of retaining a liquid nonaqueous electrolyte, is partially gelled, if a liquid nonaqueous electrolyte is contained, so as to further improve the ion conductivity within the positive electrode.

It is desirable for the polymer having an adhesivity to have a porous structure having fine pores within voids of the positive electrode, the negative electrode and the separator. It is also desirable for polymer having a porous structure to be capable of retaining a large amount of the liquid nonaqueous electrolyte and to be uniformly dispersed within the electrode group.

2) Negative Electrode

The negative electrode comprises a current collector and a negative electrode layer containing a negative electrode active material and formed on one or both surfaces of the current collector.

It is desirable for the negative electrode active material to consist of a carbon material capable of absorbing-desorbing lithium ions. The carbon material used in the present invention includes, for example, graphitized materials such as graphite, coke, carbon fiber, spherical carbon and granular carbon; carbonaceous materials such as, coke, carbon fiber, spherical carbon and granular carbon; graphitized materials obtained by applying a heat treatment at 2000 to 3000° C. to a thermosetting resin, an isotropic pitch, mesophase pitch, a mesophase pitch-based carbon fiber, vapor-grown-carbon fiber, or mesophase globules; and carbonaceous materials obtained by applying a heat treatment at 500 to 2000 C. to a thermosetting resin, an isotropic pitch, mesophase pitch, a mesophase pitch-based carbon fiber, vapor-grown-carbon fiber, or mesophase globules. Among these carbon materials, it is desirable to use the graphitized material of the mesophase pitch-based carbon fiber, the carbonaceous material of the mesophase pitch-based carbon fiber, the graphitized material of the mesophase globules, the carbonaceous material of the mesophase globules, and granular graphitized material. Among these carbon materials, it is more desirable to use carbon material a or carbon material b described below.

The carbon material a is a graphitized material having a graphite crystal where the interplanar spacing $d_{002}$ derived from (002) reflection is 0.34 nm or less, which can be obtained by setting the heat treatment temperature to 2,000° C. or more. It is desirable for the graphitized material to be granular. A nonaqueous electrolyte secondary battery including a negative electrode containing the carbon material a is capable of greatly improving the cell capacity and large current characteristic. More preferably, the interplanar spacing $d_{002}$ should be 0.336 nm or less.

The carbon material b is selected from the fibrous graphitized material having a heat treatment applied thereto at 2000° C. or higher and a spherical graphitized material having a heat treatment applied thereto at 2000° C. or higher. Particularly, it is desirable to use as the carbon material b the graphitized material of a mesophase pitch-based carbon fiber, a vapor-grown-carbon fiber such as a carbon whisker, and the graphitized material of mesophase globules. The negative electrode containing the carbon material b makes it possible to diminish the interface impedance between the negative electrode and the separator even when the density is increased to 1.3 g/cm$^3$ or more, with the result that it is possible to increase the large current discharge characteristics and the rapid charge-discharge cycle performance of the secondary battery.

The carbon material described above may be, for example, fibrous, spherical or granular. Since the negative electrode layer contains at least one kind of a carbon material selected from the group consisting of a fibrous carbon material, a spherical carbon material and a granular carbon material, it is possible to maintain the interface resistance of the negative electrode at a low value over a long period of time, leading to an improved charge-discharge cycle life. Where a liquid nonaqueous electrolyte or a gel nonaqueous electrolyte is used as the nonaqueous electrolyte, it is desirable to use the negative electrode active material containing a fibrous carbon material. The negative electrode containing a fibrous carbon material is promptly impregnated with the nonaqueous solvent having the solute dissolved therein, i.e., a nonaqueous solution having a high viscosity, making it possible to lower the negative electrode resistance and to markedly improve the cycle life of the secondary battery.

The average fiber length of the fibrous carbon material should desirably be 5 to 200 μm, more preferably 10 to 50 μm.

The average fiber diameter of the fibrous carbon material should desirably be 0.1 to 20 μm, more preferably 1 to 15 μm.

The average aspect ratio of the fibrous carbon material should desirably be 1.5 to 200, more preferably 1.5 to 50. Incidentally, the aspect ratio denotes the ratio of the fiber length to the fiber diameter (fiber length/fiber diameter).

It is desirable for the average particle diameter of the spherical carbon material to fall within a range of between 1 and 100 μm, more preferably between 2 and 40 μm.

It is desirable for a ratio of the minor radius to the major radius of the spherical carbon material (minor radius/major radius) to be at least 1/10, more preferably at least 1/2.

The granular carbon material represents a carbon powder having a ratio of the minor radius to the major radius (minor radius/major radius) falling within a range of between 1/100 and 1, more preferably between 1/10 and 1.

The average grain diameter of the granular carbon material should desirably fall within a range of between 1 and 100 μm, more preferably between 2 and 50 μm.

The negative electrode can be prepared by, for example, adding a binder to the negative electrode active material, followed by suspending the resultant mixture in a suitable solvent. Then, the current collector is coated with the suspension, followed by drying and pressing the coating so as to form the negative electrode used in the present invention. It is possible to add a conducting agent to the suspension noted above.

The binder used in the present invention includes, for example, polytetrafluoroethylene (PTFE), polyvinylidene fluoride (PVdF), ethylene-propylene-diene copolymer (EPDM), styrene-butadiene rubber (SBR) and carboxymethyl cellulose (CMC). Among these binder, it is desirable to use a thermosetting resin, particularly, polyvinylidene fluoride (PVdF).

The mixing ratio of the carbon material and the binder should desirably be 90 to 98% by weight for the carbon material and 2 to 20% by weight for the binder. Particularly, the carbon material on one surface of the negative electrode as prepared should desirably be 10 to 110 g/m$^2$. On the other hand, the loading density should desirably be 1.2 to 1.5 g/cm$^3$.

A porous conductive substrate or a non-porous conductive substrate can be used as the current collector. These conductive substrates can be formed of, for example, copper, stainless steel or nickel. The thickness of the current collector should desirably be 5 to 20 μm. Where the thickness of the current collector falls within the range noted above, the requirements for the mechanical strength and lightweight can be achieved in a good balance.

It is desirable for the thickness of the negative electrode layer to fall within a range of between 10 and 150 μm. Therefore, the thicknesses of the sum of the negative electrode layers formed on the both surfaces of the current collector should desirably fall within a range of between 20 μm and 300 μm. It is more desirable for the negative electrode layer formed on one surface of the current collector to fall within a range of between 30 μm and 100 μm. If the thickness of the negative electrode layer falls within the range noted above, the large current discharge characteristics and the cycle life of the secondary battery can be markedly improved.

It is possible for the negative electrode to contain an adhesive polymer. It is desirable for the adhesive polymer to be capable of maintaining a high adhesivity under the state of holding a liquid nonaqueous electrolyte. Further, it is desirable for the adhesive polymer to exhibit a high lithium ion conductivity. To be more specific, it is possible for the polymer described previously in conjunction with the positive electrode to be contained in the negative electrode, too.

It is desirable for the negative electrode to have an area larger than that of the positive electrode. If the area of the negative electrode is larger than the area of the positive electrode, it is possible to allow an edge portion of the negative electrode to extend out of an edge portion of the positive electrode, making it possible to suppress the current concentration on the edge portion of the negative electrode. It follows that the cycle performance and the safety of the secondary battery can be enhanced.

The carbon material capable of absorbing-desorbing lithium ions described previously can be used as the negative electrode active material. In addition, it is possible to use materials containing a metal oxide, a metal sulfide, a metal nitride, lithium metal or a lithium compound as the negative electrode active material.

The metal oxide used in the present invention includes, for example, tin oxide, silicon oxide, lithium titanium oxide, niobium oxide and tungsten oxide. The metal sulfide used in the present invention includes, for example, tin sulfide and titanium sulfide. The metal nitride used in the present invention includes, for example, lithium cobalt nitride, lithium iron nitride, and lithium manganese nitride. Further, the lithium alloy used in the present invention includes, for example, lithium-aluminum alloy, lithium-tin alloy, lithium-lead alloy and lithium-silicon alloy.

3) Nonaqueous Electrolyte

The nonaqueous electrolyte contains a nonaqueous solvent and a solute dissolved in the nonaqueous solvent.

The nonaqueous electrolyte used in the present invention includes a liquid nonaqueous electrolyte prepared by dissolving a solute in a nonaqueous solvent, and a gel nonaqueous electrolyte prepared by compounding the liquid nonaqueous electrolyte with a polymer.

As for the nonaqueous solvent, specific examples of which are propylene carbonate (PC), ethylene carbonate (EC), vinylene carbonate (VC), trifluoropropylene carbonate (TFPC), dimethyl carbonate (DMC), methylethyl carbonate (MEC), diethyl carbonate (DEC), ethyl propionate, methyl propionate, γ-butyrolactone (BL), acetonitrile (AN), ethyl acetate (EA), toluene, xylene, methyl acetate (MA), etc. These nonaqueous solvents may be employed individually or in combination thereof.

The volume ratio of γ-butyrolactone (γBL) contained in the nonaqueous solvent should be preferably at least 50% by volume of the entire nonaqueous solvent. The nonaqueous electrolyte comprising the particular nonaqueous solvent exhibits a high thermal stability and, thus, is effective for suppressing the abnormal heat generation of the battery so as to further improve the safety of the battery. If the volume ratio of γBL is less than 50% by volume, a gas tends to be generated in a large amount under high temperatures, making it difficult to suppress the swelling of the jacket. Further, where the solvent mixed with γBL is a cyclic carbonate, e.g., ethylene carbonate, the volume ratio of the cyclic carbonate is rendered relatively high. As a result, the viscosity of the solvent is increased, and the conductivity is lowered, so as to lower the charge-discharge cycle characteristics and the large current discharge characteristics. Also, if the volume ratio of γBL exceeds 95% by volume, reaction tends to take place between the negative electrode and γBL so as to lower the charge-discharge characteristics and the stability of the secondary battery. It follows that the volume ratio of γBL within the nonaqueous solvent should desirably fall within a range of between 50 and 95% by volume. More preferably, the volume ratio of γBL should fall within a range of between 55% by volume and 75% by volume. Where the volume ratio of γBL falls within the range noted above, the effect of suppressing the gas generation during storage under high temperatures is further promoted.

It is desirable to use a cyclic carbonate as a solvent mixed with γBL because the cyclic carbonate permits improving the charge-discharge efficiency of the negative electrode. The cyclic carbonate, which is used preferably in the present invention, includes, for example, propylene carbonate (PC), ethylene carbonate (EC), vinylene carbonate (VC) and trifluoropropylene carbonate (TFPC). Particularly, in the case of using EC as a solvent that is mixed with γBL, it is possible to markedly improve the charge-discharge cycle characteristics and the large current discharge characteristics. Also, it is desirable to use a mixed solvent consisting of EC and at least one solvent selected from the group consisting of PC, VC, TFPC, diethyl carbonate (DEC) and methyl ethyl carbonate (MEC) as a solvent mixed with γBL, because the use of the mixed solvent permits improving the charge-discharge characteristics of the secondary battery.

Further, it is possible for the nonaqueous electrolyte to contain not larger than 20% by volume of a solvent having a low viscosity in order to lower the viscosity of the solvent. The low viscosity solvent used in the present invention includes, for example, a linear carbonate, a linear ether and a cyclic ether.

Examples of more preferred combinations of the nonaqueous solvents used in the present invention include a combination of γBL and EC, a combination of γBL and PC, a combination of γBL, EC and DEC, a combination of γBL, EC and MEC and a combination of γBL, EC and VC. Where EC is included in the combination, it is desirable for the volume ratio of EC to fall within a range of between 5 and 50% by volume. Also, it is desirable for the volume ratio of DEC, MEC or VC to fall within a range of between 0.5 and 10% by volume.

In the present invention, it is desirable to add a surfactant such as trioctyl phosphate in an amount of 0.01 to 3% in order to improve the wettability with the separator.

The solute used in the present invention includes a lithium salt such as lithium perchlorate ($LiClO_4$), lithium hexafluoro phosphate ($LiPF_6$), lithium tetrafluoro borate ($LiBF_4$), lithium arsenic hexafluoride ($LiAsF_6$), lithium trifluoro metasulfonate ($LiCF_3SO_3$), and lithium bistrifluoromethyl sulfonylimide [$LiN(CF_3SO_2)_2$]. Particularly, it is desirable to use $LiPF_6$ and $LiBF_4$.

It is desirable for the solute to be dissolved in the nonaqueous solvent in an amount of 0.5 to 2 mol/L (liter).

The gel nonaqueous electrolyte used in the present invention can be prepared by, for example, mixing the nonaqueous solvent, the solute, the polymer and a gelling agent, followed by applying a heat treatment to the resultant mixture for the gelling purpose.

The polymer used in the present invention is at least one polymer selected from the group consisting of polyvinylidene fluoride (PVdF), polyacrylonitrile (PAN), polyethylene oxide (PEO), polyvinyl chloride (PVC) and polyacrylate (PMMA).

In the case of using a liquid nonaqueous electrolyte, it is desirable to use the liquid nonaqueous electrolyte in an amount of 0.2 to 0.6g per 100 mAh of the battery unit capacity. If the amount of the liquid nonaqueous electrolyte is smaller than 0.2 g/100 mAh, it is difficult to maintain sufficiently the ion conductivity of the positive electrode and the negative electrode. On the other hand, if the amount of the liquid nonaqueous electrolyte exceeds 0.6 g/100 mAh, the amount of the electrolyte tends to be excessively large, making it difficult to achieve sealing with a film-like jacket. More preferably, the amount of the liquid nonaqueous electrolyte should fall within a range of between 0.4 and 0.55 g/100 mAh.

4) Jacket

The electrode group and the nonaqueous electrolyte are housed in the jacket. The thickness of the jacket should be 0.25 mm or less. Particularly, it is desirable for the thickness of the jacket to fall within a range of between 0.05 mm and 0.2 mm. In this case, the battery can be made thinner and lighter in weight.

The jacket can be formed of, for example, a metal, a resin sheet such as a thermoplastic resin sheet, or a flexible metal sheet having one or both surfaces covered with a resin layer such as a thermoplastic resin layer. The resin layer and the resin sheet can be formed of a single kind of resin or a plurality of different kinds of resins, respectively. On the other hand, the metal sheet can be formed of a single kind of metal or a plurality of different kinds of metals. Examples of the metals include aluminum, iron, stainless steel, and nickel.

Particularly, it is desirable to use a flexible metal sheet having one or both surfaces covered with a resin layer because the particular laminate sheet is light in weight, has a high mechanical strength and is capable of preventing a substance such as water from entering the battery from the outside. The jacket made of the laminate sheet is sealed by, for example, a heat seal. Therefore, it is desirable to form a thermo-plastic resin layer on the inner surface of the jacket. It is desirable for the thermoplastic resin to have a melting point of at least 120° C., preferably a melting point falling within a range of between 140° C. and 250° C. The specific thermoplastic resin used in the present invention includes, for example, polyolefin such as polyethylene or polypropylene. Particularly, it is desirable to use polypropylene having a melting point of at least 150° C. because the sealing strength in the heat sealed portion is increased. On the other hand, it is desirable for the metal sheet to be made of aluminum because the aluminum sheet is capable of preventing water from entering the battery from the outside.

Where a liquid nonaqueous electrolyte or a gel nonaqueous electrolyte is used as the nonaqueous electrolyte, it is possible to arrange a separator between the positive electrode and the negative electrode. The separator will now be described in detail.

5) Separator

A porous separator is used in the present invention. The separator can be made of, for example, a porous film containing polyethylene, polypropylene or polyvinylidene fluoride (PVdF) or a nonwoven fabric made of a synthetic resin. Particularly, it is desirable to use a porous film made of polyethylene and/or polypropylene because the particular porous film permits improving the safety of the secondary battery.

It is desirable for the separator to have a thickness not larger than 30 $\mu$m. If the thickness exceeds 30 $\mu$m, the distance between the positive electrode and the negative electrode tends to be increased so as to increase the internal resistance of the secondary battery. On the other hand, it is desirable to set the lower limit of the thickness at 5 $\mu$m. If the separator is thinner than 5 $\mu$m, the mechanical strength of the separator tends to be markedly lowered so as to bring about a possibility of an internal short-circuiting. It is more desirable to set the upper limit in the thickness of the separator at 25 $\mu$m. On the other hand, it is more desirable to set the lower limit at 10 $\mu$m.

It is desirable for the separator to exhibit a thermal shrinkage of 20% or less when stored for one hour at 120° C. If the thermal shrinkage exceeds 20%, it is difficult to ensure a sufficient bonding strength between the separator and the positive electrode and between the separator and the negative electrode. It is more desirable for the thermal shrinkage to be set at 15% or less.

It is desirable for the separator to have a porosity falling within a range of between 30% and 70%. If the porosity is lower than 30%, it is difficult for the separator to hold sufficiently the electrolyte. If the porosity exceeds 70%, however, it is difficult to obtain a sufficient mechanical strength of the separator. More preferably, the separator should have a porosity falling within a range of between 35% and 70%.

It is desirable for the separator to exhibit an air permeability of 500 sec/100 $cm^3$ or less. If the air permeability exceeds 500 sec/100 $cm^3$, it is difficult to obtain a high lithium ion mobility in the separator. On the other hand, it is desirable to set the lower limit of the air permeability at 30 sec/100 $cm^3$. If the air permeability is lower than 30 sec/100 $cm^3$, it is difficult to ensure a sufficiently high mechanical strength of the separator. It is more desirable for the upper limit of the air permeability to be set at 150 sec/100 $cm^3$ and for the lower limit of the air permeability to be set at 50 sec/100 $cm^3$. The air permeability represents the time (seconds) required for an air of 100 $cm^3$ to pass through the separator.

It is desirable for the both end portions perpendicular to the longitudinal direction of the separator to extend from the both end portions perpendicular to the longitudinal direction of the negative electrode by 0.25 mm to 2 mm and for an adhesive polymer to be present in the extending portions of the separator. The particular construction permits increasing the mechanical strength in the extending portions of the separator. Therefore, it is possible to suppress the short circuiting when an impact is given to the secondary battery. Further, when the secondary battery is put under a high temperature (100° C. or more), the shrinkage of the separator can be suppressed so as to suppress occurrence of short circuiting and, thus, to improve the safety.

It is desirable for each of the peel strength between the separator and the positive electrode layer and the peel strength between the separator and the negative electrode layer to be not higher than 10 gf/cm. In this case, the resistance of the electrochemical reaction between each of the layers and the separator is lowered so as to enhance the battery performance. More preferably, each of these peel strengths should be not higher than 5 gf/cm and, most preferably, not higher than 2 gf/cm. It should be noted that the peel strength of 0 gf/cm between the separator and the positive electrode layer denotes that the separator and the positive electrode layer are not integral, and that the peel strength of 0 gf/cm between the separator and the negative electrode layer denotes that the separator and the negative electrode layer are not integral.

In order to obtain the peel strength falling within the range noted above, it is desirable to make integral the positive electrode, the negative electrode and the separator by applying a thermal curing under the state that a polymer having an adhesivity is dotted at the interface between the positive electrode layer and the separator or between the negative electrode layer and the separator, or by applying a thermal curing under the state that a polymer having an adhesivity (including a binder) is present in the voids of the positive electrode layer, the negative electrode layer and the separator. In this case, a polymer having an adhesivity is dotted or is not substantially present at the interface between the positive electrode layer and the separator and between the negative electrode layer and the separator. As a result, the electrochemical reaction is not impaired. It follows that the large current characteristics, the low temperature performance and the cycle performance of the secondary battery can be markedly improved.

The peel strength is measured by peeling test at pulling angle 180°. To be more specific, used as a measuring apparatus is Rheo meater, NRM/1010J-CW (trade name of a measuring apparatus manufactured by Fudo Kogyo K.K.). In the first step, the secondary battery is dismantled so as to take out a desired laminate body (e.g., laminate body consisting of a negative electrode current collector, a negative electrode layer and a separator). The laminate body thus taken out holds the nonaqueous electrolyte. Also, the laminate body was 20 mm wide and 50 mm long. The laminate body is put on a supporting table such that the current collector of the laminate body is in direct contact with the supporting table. Then, a double-coated tape is attached to the upper surface of the laminate body. The double-coated tape is available from Sumitomo 3M K.K. under the trade name of Scotch, CAT. No., 665-3-24. A clear film made from a rigid poly vinyl chloride was used as the base material of the double-coated tape. An acrylic resin adhesive was used as the adhesive of the double-coated tape. The contact area between the laminate body and the double-coated tape is 20×30 mm. The double-coated tape is pulled at a speed of 2 cm/min in a direction parallel to the upper surface of the laminate body so as to peel the separator from the negative electrode layer. The force required for peeling the separator is fluctuated at the beginning of the peeling operation, and the pulling force at the time when the force required for peeling the separator is rendered constant is determined as the peel strength between the negative electrode layer and the separator.

Figure 2:
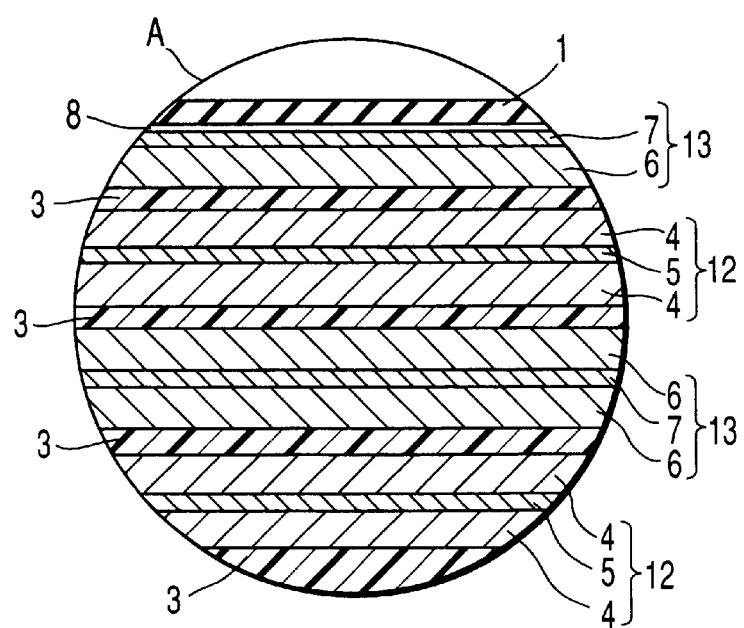
FIG. 2 is a cross sectional view showing in a magnified fashion portion A shown in FIG. 1.

A method of manufacturing a nonaqueous electrolyte secondary battery according to one embodiment of the present invention, e.g., a method of manufacturing a thin lithium ion secondary battery constructed as shown in FIGS. 1 and 2, which are to be referred to herein later, will now be described. Needless to say, the manufacturing method of the nonaqueous electrolyte secondary battery of the present invention is not restricted by the following description.

(First Step)

An electrode group is prepared first by interposing a porous sheet as a separator between a positive electrode and a negative electrode.

(Second Step)

The electrode group thus prepared is housed in a jacket formed into a bag through the opening of the bag. Then, a polymer having an adhesivity is dissolved in a solvent and the resultant solution is poured into the electrode group housed in the jacket through the opening of the jacket so as to permit the solution to be impregnated in the electrode group.

It is desirable for the solvent to consist of an organic solvent having a boiling point not higher than 200° C. The organic solvent includes, for example, dimethyl formamide having a boiling point of 153° C. If the boiling point of the organic solvent exceeds 200° C., the drying time tends to be long when the heating temperature referred to later is not higher than 100° C. It is desirable for the lower limit of the boiling point of the organic solvent to be 500° C. If the boiling point of the organic solvent is lower than 50° C., the organic solvent tends to be evaporated when the solution is poured into the electrode group. It is more desirable for the upper limit of the boiling point to be set at 180° C. and for the lower limit of the boiling point to be set at 100° C.

It is desirable for the concentration of the adhesive polymer within the solution to fall within a range of between 0.05 and 2.5% by weight. If the concentration is lower than 0.05% by weight, it is difficult to achieve bonding of the positive electrode, the negative electrode and the separator with a sufficiently high mechanical strength. On the other hand, if the concentration exceeds 2.5% by weight, it is difficult to ensure a porosity high enough to hold the liquid nonaqueous electrolyte, with the result that the interfacial impedance of the electrode tends to be markedly increased. If the interfacial impedance is increased, the battery capacity and the large current discharge characteristics are markedly lowered. It is more desirable for the concentration of the adhesive polymer within the solution to fall within a range of between 0.1 and 1.5% by weight.

Where the concentration of the adhesive polymer within the solution falls within a range of between 0.1 and 2.5% by weight, it is desirable for the pouring amount of the solution to fall within a range of between 0.1 and 2 mL (milliliters)/100 mAh of the battery capacity. If the pouring amount is smaller than 0.1 mL/100 mAh, it is difficult to increase sufficiently the bonding strength among the positive electrode, the negative electrode and the separator. on the other hand, if the pouring amount of the solution exceeds 2 mL/100 mAh, the internal resistance of the battery tends to be increased, resulting in failure to improve the discharge capacity, the large current discharge capacity and the charge-discharge cycle characteristics of the secondary battery. It is more desirable for the pouring amount of the solution to fall within a range of between 0.15 and 1 mL/100 mAh of the battery capacity.

(Third Step)

The electrode group is pressurized under a high temperature of 30° C. or higher and under a reduced pressure including vacuum or atmospheric pressure with a pressure falling within a range of between 0.05 kg/cm$^2$ and 10 kg/cm$^2$ to allow the electrode group to have a predetermined thickness, thereby forming an electrode group.

It is desirable to form the electrode group under a reduced pressure including vacuum and at 60° C., to 100° C. because drying is also achieved under these conditions. More preferably, the pressure should fall within a range of between 0.01 and 2 kg/cm$^2$ and the temperature should fall within a range of between 60° C. and 100° C.

The pressurizing can be achieved by pressing such as a plane table press or a roll press. It is also possible to insert the electrode group into a holder having a predetermined thickness. Further, it is possible to apply the pressurizing to the electrode group covered with the jacket or to the bare electrode group.

(Fourth Step)

After the liquid nonaqueous electrolyte is poured into the electrode group housed in the jacket, the opening of the jacket is sealed so as to obtain a thin nonaqueous electrolyte secondary battery.

In the manufacturing method described above, the solution having the adhesive polymer dissolved therein was poured into the jacket after the electrode group was housed in the jacket. However, it is also possible to pour the particular solution into the electrode group that is not housed in the jacket. In this case, the electrode group is prepared first by interposing a separator between the positive electrode and the negative electrode. After the electrode group is impregnated with the solution, drying under heating is applied to the electrode group at 30° C. or higher, with the electrode group kept pressed with a pressure of 0.05 to 10 $kg/cm^2$, so as to evaporate the solvent of the solution and, thus, to form the electrode group having a predetermined thickness. After the electrode group thus prepared is housed in the jacket, the liquid nonaqueous electrolyte is poured into the electrode group, followed by sealing the opening of the jacket so as to obtain a thin nonaqueous electrolyte secondary battery. It is possible to coat the outer circumferential surface of the electrode group with an adhesive polymer before the electrode group is housed in the jacket. In this case, the electrode group can be bonded to the jacket.

In the manufacturing method described above, a polymer having an adhesivity is used for making integral the positive electrode, the negative electrode and the separator. Alternatively, it is also possible to employ, for example, a method of thermally curing a binder contained in the positive electrode and the negative electrode. To be more specific, a structure having a separator interposed between the positive electrode and the negative electrode is wound to form a flat structure, or the positive electrode and the negative electrode having a separator interposed therebetween are folded at least once. By applying pressure under heat to the resultant flat structure, the binder contained in the positive electrode and the negative electrode is thermally cured so as to make integral the positive electrode, the negative electrode and the separator, thereby obtaining the electrode group. Incidentally, the pressure application under heat can be performed under the conditions similar to those described previously in conjunction with the third step.

FIGS. 1 and 2 collectively exemplify a nonaqueous electrolyte secondary battery of the present invention. Specifically, FIGS. 1 and 2 collectively show a thin lithium ion secondary battery according to one embodiment of the nonaqueous electrolyte secondary battery of the present invention. FIG. 1 is a cross sectional view showing a thin lithium ion secondary battery according to one embodiment of the nonaqueous electrolyte secondary battery of the present invention, and FIG. 2 is a cross sectional view showing in a magnified fashion portion A shown in FIG. 1.

As shown in FIG. 1, an electrode group 2 is housed in a jacket 1 made of a sheet including, for example, a resin layer. The electrode group 2 is prepared by winding into a flat structure a laminate body consisting of the positive electrode, the separator and the negative electrode. T denotes the wall thickness of the jacket 1. As shown in FIG. 2, the laminate body comprises a separator 3; a positive electrode 12 including a positive electrode layer 4, a positive electrode current collector 5 and a positive electrode layer 4; the separator 3; a negative electrode 13 including a negative electrode layer 6, a negative electrode current collector 7 and a negative electrode layer 6; the separator 3; the positive electrode 12 including the positive electrode layer 4, the positive electrode current collector 5 and the positive electrode layer 4; the separator 3; and the negative electrode 13 including the negative electrode layer 6 and the negative current collector 7, in the order mentioned as viewed from below. The negative electrode current collector 7 is positioned in the outermost circumferential surface of the electrode group 2. An adhesive layer 8 is interposed between the surface of the electrode group 2 and the inner surface of the jacket 1. A nonaqueous electrolyte is housed in the jacket 1. One end of a band-like lead wire 10 of the positive electrode is connected to the positive electrode current collector 5, with the other end extending outward from within the jacket 1. On the other hand, one end of a band-like lead wire 11 of the negative electrode is connected to the negative electrode current collector 7, with the other end extending outward from within the jacket 1.

The positive electrode 12, the negative electrode 13 and the separator 3 are made integral by the polymer having an adhesivity, which is present in the voids of the positive electrode layer 4, the separator 3 and the negative electrode layer 6, in the boundary between the positive electrode layer 4 and the separator 3 and in the boundary between the negative electrode layer 6 and the separator 3. The adhesive polymer present in the positive electrode layer 4 and the negative electrode layer 6 also acts as a binder.

The adhesive layer 8, which serves to bond the jacket 1 to the electrode group 2, permits suppressing the deformation of the secondary battery. The adhesive layer 8 can be formed of the adhesive polymer noted above. It is possible for the adhesive layer 8 to have a porous structure. The porous adhesive layer 8 is capable of retaining the liquid nonaqueous electrolyte in the pores. Incidentally, FIG. 1 shows that the adhesive layer 8 is formed to cover the entire surface of the electrode group 2. However, it is possible for the adhesive layer 8 to cover partly the surface of the electrode group 2. Where the adhesive layer 8 is formed to cover partly the surface of the electrode group 2, it is desirable for the adhesive layer 8 to cover at least the surface corresponding to the outermost circumferential surface of the electrode group 2. Incidentally, it is possible to omit the adhesive layer 8.

It is desirable for the total amount of the adhesive polymer including the material used in the adhesive layer to fall within a range of between 0.1 and 6 mg/100 mAh of the battery capacity. If the total amount of the adhesive polymer is smaller than 0.1 mg/100 mAh of the battery capacity, it is difficult to improve sufficiently the bonding strength between the positive electrode and the separator and between the separator and the negative electrode. On the other hand, if the total amount noted above exceeds 6 mg/100 mAh of the battery capacity, the lithium ion conductivity of the secondary battery tends to be lowered. Also, the internal resistance of the secondary battery tends to be increased. It follows that it is difficult to improve the discharge capacity, the large current discharge capacity and the charge-discharge cycle characteristics. It is more desirable for the total amount of the adhesive polymer to fall within a range of between 0.2 and 1 mg/100 mAh of the battery capacity.

The nonaqueous electrolyte secondary battery of the present invention described above comprises a jacket having a wall thickness not larger than 0.25 mm, a positive electrode housed in the jacket and containing a positive electrode active material, a negative electrode housed in the jacket and containing a negative electrode active material capable of absorbing-desorbing lithium ions, and a nonaqueous electrolyte housed in the jacket. The positive electrode active material is provided by a first oxide containing an element M, Li and Ni, said element M being at least one element selected from the group consisting of Al, B, Sn and Nb, or by a second oxide containing the element M, Li, Ni and Co. The pH of the positive electrode active material falls within a range of between 10 and 12.

The secondary battery of the particular construction permits improving the safety while ensuring a high battery capacity.

To be more specific, each of the first oxide and the second oxide permits increasing the battery capacity. At the same time, each of the first oxide and the second oxide is relatively excellent in its thermal stability. Therefore, the thermal decomposition reaction is unlikely to take place in the case where the inner temperature of the battery is increased by the internal short circuiting and, thus, generation of the oxygen gas can be suppressed. Also, when a large current flows because of, for example, the internal short circuiting so as to elevate the inner temperature of the battery, it is possible to suppress the reaction between the residual alkali component within the positive electrode active material and the nonaqueous electrolyte, making it possible to suppress the generation of carbon dioxide gas. It follows that it is possible to suppress the elevation of the inner pressure of the battery.

The nonaqueous electrolyte secondary battery of the present invention described above comprises a jacket having a wall thickness not larger than 0.25 mm, a positive electrode housed in the jacket and containing a positive electrode active material, a negative electrode housed in the jacket and containing a negative electrode active material capable of absorbing-desorbing lithium ions, and a nonaqueous electrolyte housed in the jacket and containing a nonaqueous solvent and a solute dissolved in the nonaqueous solvent. The positive electrode active material is provided by a first oxide containing an element M, Li and Ni, said element M being at least one element selected from the group consisting of Al, B, Sn and Nb, or by a second oxide containing the element M, Li, Ni and Co. Also, the nonaqueous solvent contains at least 50% by volume of $\gamma$-butyrolactone.

The secondary battery of the particular construction permits improving the safety while ensuring a high battery capacity.

To be more specific, each of the first oxide and the second oxide permits increasing the battery capacity. At the same time, each of the first oxide and the second oxide is relatively excellent in its thermal stability. Therefore, the thermal decomposition reaction is unlikely to take place in the case where the inner temperature of the battery is increased by the internal short circuiting and, thus, generation of the oxygen gas can be suppressed. On the other hand, the nonaqueous electrolyte contains the nonaqueous solvent containing at least 50% by volume of $\gamma$-butyrolactone that is unlikely to be oxidized and decomposed within the nonaqueous solvent, making it possible to suppress greatly the reaction between the generated oxygen gas and the nonaqueous solvent. It follows that, when a large current flows because of, for example, the internal short circuiting so as to elevate the inner temperature of the battery, it is possible to suppress the elevation of the inner pressure. Also, since it is possible to prevent the battery temperature from being excessively increased, the gas spurting and ignition can be prevented, leading to a further improved safety of the secondary battery.

In the secondary battery of the present invention, the pH value of the positive electrode active material is set to fall within a range of between 10 and 12. Therefore, when a large current flows because of, for example, the internal short circuiting so as to elevate the inner temperature of the battery, it is possible to suppress the reaction between the residual alkali component within the positive electrode active material and the nonaqueous electrolyte, making it possible to suppress the generation of carbon dioxide gas. It follows that it is possible to suppress sufficiently the elevation of the inner pressure of the battery.

It should also be noted that, in the secondary battery of the present invention, it is possible to use the negative electrode active material containing a fibrous carbon material in the case of using a liquid nonaqueous electrolyte or a gel nonaqueous electrolyte. As a result, the resistance of the negative electrode can be diminished so as to further improve the cycle life of the secondary battery.

To be more specific, the liquid nonaqueous electrolyte has a relatively high viscosity because the volume ratio of $\gamma$-butyrolactone within the nonaqueous a solvent is at least 50% by volume. On the other hand, the electrode group containing the gel nonaqueous electrolyte is prepared by, for example, the steps of manufacturing a precursor of gel nonaqueous electrolyte containing the solute, nonaqueous solvent and polymer, arranging the precursor of gel nonaqueous electrolyte between the positive electrode and the negative electrode to form an electrode group, impregnating the electrode group with a liquid nonaqueous electrolyte, and applying a heat treatment to the electrode group. Since the negative electrode containing the negative electrode active material containing a fibrous carbon material is promptly impregnated with the liquid nonaqueous electrolyte having a high viscosity, the negative electrode resistance can be lowered, leading to an improved cycle life of the secondary battery.

Some Examples of the present invention will now be described with reference to the accompanying drawings.

EXAMPLE 1

<Preparation of Positive Electrode>

A powder of lithium-nickel-cobalt-aluminum complex oxide represented by a chemical formula $LiNi_{0.75}Co_{0.15}Al_{0.1}O_2$ and having a PH of 11.0 was prepared. The PH value was measured by the method described below.

Specifically, 2 g of the positive electrode active material noted above was added to 100 mL of pure water, and the pH value was continuously measured at 25° C. by using a pH measuring apparatus with the stirring speed at rotation number per one second of 3. The pH value at the time when a change with time in the pH value was not recognized, i.e., when the change in pH value was not larger than 0.001 in one minute, was determined as the pH value of the positive electrode active material.

Slurry was prepared by adding 2% by weight of acetylene black, 3% by weight of graphite, 4% by weight of polyvinylidene fluoride (PVdF), and a solution of N-methyl pyrrolidone (NMP) to 91% by weight of the powder of lithium-nickel-cobalt-aluminum complex oxide. A current collector consisting of an aluminum foil having a thickness of 10 $\mu$m was coated with the resultant slurry, followed by drying and, then, pressing the coated current collector so as to obtain a positive electrode having an electrode density of 3.0 g/cm$^3$ and a thickness of 120 $\mu$m. When measured by the peeling test at pulling angle 180°, the peel strength between the positive electrode layer and the current collector was found to be 15 gf/cm.

<Preparation of Negative Electrode>

Mesophase pitch-based carbon fibers were prepared through a heat treatment at a temperature of 3,000° C. as a carbon material. The carbon fibers were 8 μm in fiber diameter, 20μm in average fiber length and 0.3360 nm in interplanar spacing $d_{002}$. Thereafter, 93% by weight of the powder of carbon fibers, 7% by weight of polyvinylidene fluoride (PVdF), and a solution of NMP were mixed together to prepare a slurry. Then, both surfaces of a current collector consisting of a copper foil having a thickness of 10 μm were coated with the resultant slurry, followed by drying and subsequently pressing the coated current collector so as to obtain a negative electrode having an electrode density of 1.35 g/cm³ and negative electrode layers each having a thickness of 45 μm formed on both surfaces of the current collector. In other words, the sum of the thicknesses of the negative electrode layers formed on both surfaces of the current collector was 90 μm. When measured by the peeling test at pulling angle 180°, the peel strength between the negative electrode layer and the current collector was found to be 12 gf/cm.

<Preparation of Flat Electrode Group>

Prepared was a polyethylene separator having a thickness of 27 μm, a porosity of 50% and an air permeability of 90 sec/100 cm³. A structure prepared by interposing the separator thus prepared between the positive electrode and the negative electrode was spirally wound and, then, flattened so as to obtain a flat electrode group having a thickness of 2.7 mm, a width of 30 mm and a height off 50 mm.

<Preparation of Liquid Nonaqueous Electrolyte>

A liquid nonaqueous electrolyte was prepared by dissolving 1.5 mol/L of lithium tetrafluoroborate ($LiBF_4$) in a mixed solvent consisting of 40% by volume of ethylene carbonate (EC) and 60% by volume of γ-butyrolactone (γBL).

<Formation of Electrode Group>

A laminate film having a thickness of 0.1 mm and consisting of an aluminum foil having each surface covered with a polypropylene film was prepared as a jacket material and formed into a bag. Then, the flat electrode group was housed in the bag, and the both surfaces of the battery were held by a holder such that the thickness of the battery was fixed at 2.7 mm. The pressure applied to the electrode group in this step was found to be 0.5 kg/cm². Further, 0.3% by weight of polyvinylidene fluoride (PVdF), which is a polymer having an adhesivity, was dissolved in an organic solvent of dimethyl formamide (DMF) having a boiling point of 153° C. The resultant solution was poured in an amount of 0.6 mL into the electrode group housed in the laminate bag so as to permit the solution to permeate into the electrode group and, at the same time, to permit the solution to be attached to the entire surface of the electrode group.

Then, a vacuum drying was applied to the electrode group housed in the laminate bag at 80° C. for 12 hours so as to evaporate the organic solvent and to allow the voids of the positive electrode, the negative electrode and the separator to hold the polymer having an adhesivity. As a result, a porous bonded region was formed on the surface of the electrode group.

Finally, 2 g of the liquid nonaqueous electrolyte was poured into the electrode group housed in the laminate bag so as to assemble a thin nonaqueous electrolyte secondary battery constructed as shown in FIGS. 1 and 2 and having a thickness of 2.7 mm, a width of 32 mm, and a height of 55 mm.

EXAMPLE 2

A powder of lithium-nickel-cobalt-aluminum complex oxide represented by a chemical formula $LiNi_{0.75}Co_{0.15}Al_{0.1}O_2$ and having a PH of 11.5 was prepared. The PH value was measured by the aforementioned method. A positive electrode was prepared as in Example 1, except that the powder of lithium-nickel-cobalt-aluminum complex oxide was used as the positive electrode active material.

A structure prepared by interposing the separator similar to that used in Example 1 between the positive electrode and the negative electrode similar to that prepared in Example 1 was spirally wound and, then, flattened so as to obtain a flat electrode group having a thickness of 2.7 mm, a width of 30 mm and a height off 50 mm.

The flat electrode group was housed in a jacket (laminate bag) similar to that prepared in Example 1, followed by formation with a pressure of 1 kg/cm² applied in a thickness direction of the electrode group by using the holder described previously. Then, a vacuum drying was applied to the electrode group housed in the laminate bag at 80° C. for 12 hours, followed by pouring 2 g of a liquid nonaqueous electrolyte similar to that used in Example 1 into the electrode group housed in the laminate bag so as to obtain a thin nonaqueous electrolyte secondary battery having a thickness of 2.7 mm, a width of 32 mm and a height of 55 mm.

EXAMPLE 3

A thin nonaqueous electrolyte secondary battery was prepared as in Example 1, except that $LiNi_{0.75}Co_{0.1}Al_{0.15}O_2$ having a PH of 11.2 was used as the positive electrode active material.

EXAMPLE 4

A thin nonaqueous electrolyte secondary battery was prepared as in Example 1, except that $LiNi_{0.8}Co_{0.15}Al_{0.04}B_{0.01}O_2$ having a PH of 11.5 was used as the positive electrode active material.

EXAMPLE 5

A thin nonaqueous electrolyte secondary battery was prepared as in Example 1, except that $LiNi_{0.8}Co_{0.14}Al_{0.04}B_{0.01}Nb_{0.01}O_2$ having a PH of 11.5 was used as the positive electrode active material.

EXAMPLE 6

A thin nonaqueous electrolyte secondary battery was prepared as in Example 1, except that $LiNi_{0.8}Co_{0.14}Al_{0.5}Sn_{0.0}O_2$ having a PH of 12.0 was used as the positive electrode active material.

EXAMPLE 7

A thin nonaqueous electrolyte secondary battery was prepared as in Example 1, except that $LiNi_{0.9}Al_{0.1}O_2$ having a PH of 11.5 was used as the positive electrode active material.

EXAMPLE 8

A thin nonaqueous electrolyte secondary battery was prepared as in Example 1, except that $LiNi_{0.77}Al_{0.2}B_{0.03}O_2$ having a PH of 11.0 was used as the positive electrode active material.

EXAMPLE 9

A thin nonaqueous electrolyte secondary battery was prepared as in Example 1, except that $LiNi_{0.77}Al_{0.2}Sn_{0.03}O_2$ having a PH of 11.8 was used as the positive electrode active material.

EXAMPLE 10

<Preparation of Gel-like Nonaqueous Electrolyte>

Paste was prepared by mixing a liquid nonaqueous electrolyte similar to that prepared in Example 1 with a solution prepared by dissolving polyvinylidene fluoride-hexafluoropropylene (PVdF-HFP) in tetrahydroxy furan (THF). A substrate was coated with the resultant paste, followed by drying the coated paste so as to obtain a thin film.

<Preparation of Electrode Group>

A positive electrode was prepared as in Example 1, except that $LiNi_{0.75}Co_{0.15}Al_{0.1}O_2$ having pH of 11.2 was used as the positive electrode active material.

An electrode group was prepared by spirally winding a structure having the thin film noted above interposed between the positive electrode and the negative electrode similar to that prepared in Example 1, followed by flattening the spirally wound structure.

The electrode group thus prepared was dipped in the liquid nonaqueous electrolyte noted above, followed by plasticizing the thin film under a reduced pressure so as to obtain an electrode group having the gel nonaqueous electrolyte layer interposed between the positive electrode and the negative electrode.

On the other hand, a laminate film equal to that prepared in Example 1 was formed into a bag, and the electrode group thus prepared was housed in the bag so as to assemble a thin nonaqueous electrolyte secondary battery having a thickness of 2.7 mm, a width of 32 mm, and a height of 55 mm.

EXAMPLE 11

A thin nonaqueous electrolyte secondary battery was prepared as in Example 2, except that $LiNi_{0.75}Co_{0.15}Al_{0.1}O_2$ having a PH of 10.8 was used as the positive electrode active material and a solution prepared by dissolving 1.5 mol/L of $LiPF_6$ in a mixed solvent consisting of 48% by volume of ethylene carbonate (EC), 50% by volume of propylene carbonate (PC) and 2% by volume of vinylene carbonate (VC) was used as the liquid nonaqueous electrolyte.

EXAMPLE 12

A thin nonaqueous electrolyte secondary battery was prepared as in Example 11, except that $LiNio_{0.75}Co_{0.15}Al_{0.1}O_2$ having a PH of 11.4 was used as the positive electrode active material.

EXAMPLE 13

A thin nonaqueous electrolyte secondary battery was prepared as in Example 11, except that $LiNi_{0.75}Co_{0.15}Al_{0.1}O_2$ having a PH of 12.0 was used as the positive electrode active material.

Comparative Example 1

A thin nonaqueous electrolyte secondary battery was prepared as in Example 1, except that $LiNiO_2$ having a PH of 12.2 was used as the positive electrode active material.

Comparative Example 2

A thin nonaqueous electrolyte secondary battery was prepared as in Example 1, except that $LiNi_{0.8}Co_{0.2}O_2$ having a PH of 12.1 was used as the positive electrode active material.

Comparative Example 3

A thin nonaqueous electrolyte secondary battery was prepared as in Example 1, except that $LiNi_{0.75}Co_{0.15}Al_{0.1}O_2$ having a PH of 12.3 was used as the positive electrode active material and a solution prepared by dissolving 1 mol/L of $LiPF_6$ in a mixed solvent consisting of 50 parts by volume of EC and 50 parts by volume of MEC was used as the liquid nonaqueous electrolyte.

Comparative Example 4

A thin nonaqueous electrolyte secondary battery was prepared as in Example 1, except that $LiNi_{0.75}Co_{0.15}Al_{0.1}O_2$ having a PH of 12.2 was used as the positive electrode active material and a solution prepared by dissolving 1.5 mol/L of $LiPF_6$ in a mixed solvent consisting of 60 parts by volume of EC and 40 parts by volume of γ-butyrolactone was used as the liquid nonaqueous electrolyte.

Comparative Example 5

A thin nonaqueous electrolyte secondary battery was prepared as in Example 1, except that $LiCoO_2$ having a PH of 10.5 was used as the positive electrode active material.

Each of the secondary batteries prepared in Examples 1 to 13 and Comparative Examples 1 to 5 was charged at 0.5C for 3 hours under a constant voltage of 4.2V, followed by discharge at 0.5C to 3V so as to obtain the battery capacity. Table 1 shows the results.

Also, each of the secondary batteries prepared in Examples 1 to 13 and Comparative Examples 1 to 5 was over-charged to 4.4V so as to carry out a needle sticking safety performance test, thereby measuring the battery temperature and the swelling rate of the jacket, with the results as shown in Table 1.

Further, each of the secondary batteries prepared in Examples 1 to 13 and Comparative Examples 1 to 5 was subjected to a charge-discharge cycle test, in which each of the secondary batteries was charged at 0.5C for 3 hours under a constant voltage of 4.2V, followed by discharge at 0.5C to 3V, thereby obtaining the number of charge-discharge cycles at the time when the battery capacity was lowered to 80% of the initial capacity. Table 1 also shows the results.

TABLE 1

| | Solvent of liquid electrolyte (mixing ratio by volume) | Electrolyte | Electrolyte concentration (mol/L) | Positive electrode active material | PH of positive electrode active material |
|---|---|---|---|---|---|
| Example 1 | EC, γ BL (40:60) | $LiBF_4$ | 1.5 | $LiNi_{0.75}Co_{0.15}Al_{0.1}O_2$ | 11.0 |
| Example 2 | EC, γ BL (40:60) | $LiBF_4$ | 1.5 | $LiNi_{0.75}Co_{0.15}Al_{0.1}O_2$ | 11.5 |
| Example 3 | EC, γ BL (40:60) | $LiBF_4$ | 1.5 | $LiNi_{0.75}Co_{0.1}Al_{0.15}O_2$ | 11.2 |
| Example 4 | EC, γ BL (40:60) | $LiBF_4$ | 1.5 | $LiNi_{0.8}Co_{0.15}Al_{0.04}B_{0.01}O_2$ | 11.5 |
| Example 5 | EC, γ BL (40:60) | $LiBF_4$ | 1.5 | $LiNi_{0.8}Co_{0.14}Al_{0.04}B_{0.01}Nb_{0.01}O_2$ | 11.5 |
| Example 6 | EC, γ BL (40:60) | $LiBF_4$ | 1.5 | $LiNi_{0.8}Co_{0.14}Al_{0.05}Sn_{0.01}O_2$ | 12.0 |
| Example 7 | EC, γ BL (40:60) | $LiBF_4$ | 1.5 | $LiNi_{0.9}Al_{0.1}O_2$ | 11.5 |
| Example 8 | EC, γ BL (40:60) | $LiBF_4$ | 1.5 | $LiNi_{0.77}Al_{0.2}B_{0.03}O_2$ | 11.0 |
| Example 9 | EC, γ BL (40:60) | $LiBF_4$ | 1.5 | $LiNi_{0.77}Al_{0.2}Sn_{0.03}O_2$ | 11.8 |
| Example 10 | EC, γ BL (40:60) | $LiBF_4$ | 1.5 | $LiNi_{0.75}Co_{0.15}Al_{0.1}O_2$ | 11.2 |
| Example 11 | EC, PC, VC (48:50:2) | $LiPF_6$ | 1.5 | $LiNi_{0.75}Co_{0.15}Al_{0.1}O_2$ | 10.8 |
| Example 12 | EC, PC, VC (48:50:2) | $LiPF_6$ | 1.5 | $LiNi_{0.75}Co_{0.15}Al_{0.1}O_2$ | 11.4 |
| Example 13 | EC, PC, VC (48:50:2) | $LiPF_6$ | 1.5 | $LiNi_{0.75}Co_{0.15}Al_{0.1}O_2$ | 12.0 |
| Comparative Example 1 | EC, γ BL (40:60) | $LiBF_4$ | 1.5 | $LiNiO_2$ | 12.2 |
| Comparative Example 2 | EC, γ BL (40:60) | $LiBF_4$ | 1.5 | $LiNi_{0.8}Co_{0.2}O_2$ | 12.1 |
| Comparative Example 3 | EC, MEC (50:50) | $LiPF_6$ | 1 | $LiNi_{0.75}Co_{0.15}Al_{0.1}O_2$ | 12.3 |
| Comparative Example 4 | EC, γ BL (60:40) | $LiPF_6$ | 1.5 | $LiNi_{0.75}Co_{0.15}Al_{0.1}O_2$ | 12.2 |
| Comparative Example 5 | EC, γ BL (40:60) | $LiBF_4$ | 1.5 | $LiCoO_2$ | 10.5 |

| | Capacity | Needle sticking test state (battery temperature) | Swelling rate (%) | Cycle life |
|---|---|---|---|---|
| Example 1 | 500 | Only Exothermic reaction (100° C.) | 2 | 520 |
| Example 2 | 510 | Only Exothermic reaction (100° C.) | 3 | 530 |
| Example 3 | 480 | Only Exothermic reaction (80° C.) | 2 | 560 |
| Example 4 | 520 | Only Exothermic reaction (120° C.) | 3 | 600 |
| Example 5 | 520 | Only Exothermic reaction (100° C.) | 3 | 500 |
| Example 6 | 515 | Only Exothermic reaction (120° C.) | 5 | 500 |
| Example 7 | 530 | Only Exothermic reaction (130° C.) | 3 | 450 |
| Example 8 | 500 | Only Exothermic reaction (120° C.) | 2 | 500 |
| Example 9 | 500 | Only Exothermic reaction (125° C.) | 5 | 500 |
| Example 10 | 480 | Only Exothermic reaction (100° C.) | 2 | 400 |
| Example 11 | 450 | Only Exothermic reaction (110° C.) | 3 | 550 |
| Example 12 | 460 | Only Exothermic reaction (115° C.) | 4 | 560 |
| Example 13 | 440 | Only Exothermic reaction (130° C.) | 6 | 500 |
| Comparative Example 1 | 540 | Ignition (>500° C.) | 10 | 200 |
| Comparative Example 2 | 520 | Ignition (>500° C.) | 8 | 350 |
| Comparative Example 3 | 500 | Blow of gas (320° C.) | 25 | 500 |
| Comparative Example 4 | 450 | Blow of gas (300° C. | 10 | 250 |
| Comparative Example 5 | 420 | Only Exothermic reaction (100 ° C.) | 2 | 500 |

As apparent from Table 1, the secondary batteries prepared in Examples 1 to 13 are superior to the secondary batteries prepared in Comparative Examples 1 to 5 in the battery capacity, the safety, and the cycle life characteristics.

EXAMPLE 14 to 18

5 types of lithium-nickel-cobalt-aluminum complex oxide represented by a chemical formula $LiNi_{0.8}Co_{0.14}Al_{0.06}O_2$ and having the PH value of 10.8, 11.2, 11.4, 11.8 and 12.0 were prepared. The PH value was measured by the aforementioned method.

A positive electrode was prepared as in Example 1, except that a powder of lithium-nickel-cobalt-aluminum complex oxide noted above was used as the positive electrode active material.

<Preparation of Negative Electrode>

A graphitized material of a mesophase pitch-based carbon fiber was prepared as the carbon material by applying a heat treatment at 3000° C. to the mesophase pitch-based carbon fiber. The carbon fiber was found to have an average fiber diameter of 10 μm, an average fiber length of 30 μm, an average aspect ratio of 20, and an average interplanar spacing ($d_{002}$) of 0.3358 nm. Slurry was prepared by adding 7% by weight of polyvinylidene fluoride (PVdF) used as a binder and an NMP solution to 93% by weight of the carbon material. Both surfaces of a current collector consisting of a copper foil having a thickness of 10 μm were coated with the resultant slurry, followed by drying and subsequently pressing the coated current collector so as to obtain a negative electrode having an electrode density of 1.35 g/cm³.

<Preparation of Liquid Nonaqueous Electrolyte>

A liquid nonaqueous electrolyte was prepared by dissolving 1.5 mol/L of $LiBF_4$ in a mixed solvent consisting of 24 parts by volume of ethylene carbonate (EC), 75 parts by volume of γ-butyrolactone (γBL) and 1 parts by volume of vinylene carbonate (VC).

A structure consisting of the positive electrode, the negative electrode and a separator interposed between these positive and negative electrodes, said separator being similar to that used in Example 1, was spirally wound, followed by flattening the wound structure so as to obtain a flat electrode group having a thickness of 2.7 mm, a width of 30 mm and a height of 50 mm. Then, the electrode group was pressed at 90° C. with a pressure of 12 kg/cm².

A laminate film similar to that used in Example 1 was prepared as a jacket material and formed into a bag. The flat electrode group was housed in the bag, followed by pouring 2 g of the liquid nonaqueous electrolyte into the electrode group so as to obtain a thin nonaqueous electrolyte secondary battery having a thickness of 2.7 mm, a width of 32 mm and a height of 55 mm.

of 0.3355 nm. A thin nonaqueous electrolyte secondary battery was prepared as in Example 14 except the carbon material described above was used as negative electrode active material.

Each of the secondary batteries prepared in Examples 14 to 20 was charged at 0.5C for 3 hours under a constant voltage of 4.2V, followed by discharge at 0.5C to 3V so as to obtain the battery capacity. Table 2 shows the results.

Also, each of the secondary batteries prepared in Examples 14 to 20 was over-charged to 4.4V so as to carry out a needle sticking safety performance test, thereby measuring the battery temperature and the swelling rate of the jacket, with the results as shown in Table 2.

Further, each of the secondary batteries prepared in Examples 14 to 20 was subjected to a charge-discharge cycle test, in which each of the secondary batteries was charged at 0.5C for 3 hours under a constant voltage of 4.2V, followed by discharge at 0.5C to 3V, thereby obtaining the number of charge-discharge cycles at the time when the battery capacity was lowered to 80% of the initial capacity. Table 2 also shows the results.

TABLE 2

|  | PH of positive electrode active material | King of negative electrode active material | Capacity | Needle sticking test state (battery temperature) | Swelling rate (%) | Cycle life |
| --- | --- | --- | --- | --- | --- | --- |
| Example 14 | 10.8 | Fibrous carbon material | 540 | Only Exothermic reaction (100° C.) | 1.5 | 600 |
| Example 15 | 11.2 | Fibrous carbon material | 560 | Only Exothermic reaction (110° C.) | 2 | 620 |
| Example 16 | 11.4 | Fibrous carbon material | 565 | Only Exothermic reaction (115° C.) | 2.5 | 650 |
| Example 17 | 11.8 | Fibrous carbon material | 560 | Only Exothermic reaction (120° C.) | 3 | 550 |
| Example 18 | 12.0 | Fibrous carbon material | 540 | Only Exothermic reaction (125° C.) | 6 | 500 |
| Example 19 | 10.8 | Spherical carbon material | 530 | Only Exothermic reaction (123° C.) | 1.6 | 500 |
| Example 20 | 10.8 | Fibrous carbon material and granular carbon material | 570 | Only Exothermic reaction (125° C.) | 1.8 | 500 |

EXAMPLE 19

A graphitized material of mesophase globules was prepared as the carbon material by applying a heat treatment to the mesophase globules at 3000° C. The mesophase globules were found to have an average particle diameter of 6 μm, a ratio of the minor radius to the major radius of 0.9 and an average interplanar spacing ($d_{002}$) of 0.3360 nm. A thin nonaqueous electrolyte secondary battery was prepared as in Example 14 except the spherical carbon material noted above was used as negative electrode active material.

EXAMPLE 20

A mixed powder consisting of 50% by weight of mesophase pitch-based carbon fiber, which was subjected to a heat treatment at 3000° C., and 50% by weight of granular graphite was prepared as a carbon material. The carbon fiber was found to have an average fiber diameter of 10 μm, an average fiber length of 30 μm, an average aspect ratio of 20 and an average interplanar spacing ($d_{002}$) of 0.3358 nm. On the other hand, the granular graphite were found to have an average diameter of 10 μm, a ratio of the minor radius to the major radius of 0.6 and an average interplanar spacing ($d_{002}$)

As apparent from Table 2, the swelling of the jacket is increased with increase in the pH value of the positive electrode active material. Also, the secondary battery in Example 14, which included the negative electrode containing a fibrous carbon material and a granular carbon material as the negative electrode active material, was found to exhibit a cycle life longer than that of the secondary battery in each of Examples 19 and 20.

As described above in detail, the present invention provides a thin nonaqueous electrolyte secondary battery of a high capacity excellent in the cycle life characteristics and capable of ensuring a high safety.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery, comprising a jacket formed of a laminate film having a thickness of 0.2 mm or less and containing a metal layer and a resin layer laminated on one or both sides of the metal layer, a positive electrode housed in the jacket and containing a positive electrode active material, a negative electrode housed in the jacket and containing a negative electrode active material, and a nonaqueous electrolyte housed in the jacket, wherein said positive electrode active material comprises at least one kind of oxide selected from the group consisting of an oxide containing the elements M, Li and Ni and an oxide containing the elements M, Li, Ni and Co, wherein said element M being at least one element selected from the group consisting of Al, B, Sn and Nb, and the pH of said positive electrode active material falls within a range of between 10 and 12.

2. The nonaqueous electrolyte secondary battery according to claim 1, wherein said oxide containing the elements M, Li and Ni has a composition represented by formula (1):

$$Li_aNi_{1-b}M_bO_2 \qquad (1)$$

wherein M is at least one element selected from the group consisting of Al, B, Sn and Nb, and atomic ratios a and b are: $0<a\leq1.2$ and $0.004\leq b\leq0.17$.

3. The nonaqueous electrolyte secondary battery according to claim 2, wherein said element M is at least one of Al and B, and said atomic ratio b is: $0.02\leq b\leq0.1$.

4. The nonaqueous electrolyte secondary battery according to claim 1, wherein said oxide containing the elements M, Li, Ni and Co has a composition represented by formula (2):

$$Li_xNi_{1-y-z}Co_zM_yO_2 \qquad (2)$$

where M is at least one element selected from the group consisting of Al, B, Sn and Nb, and the atomic ratios x, y and z are: $0<x\leq1.2$; $0.004<y<0.17$; $0<z<0.3$.

5. The nonaqueous electrolyte secondary battery according to claim 4, wherein said element M is at least one of Al and Nb, and said atomic ratio y is: $0.02\leq y\leq0.1$.

6. The nonaqueous electrolyte secondary battery according to claim 1, wherein said nonaqueous electrolyte is a liquid nonaqueous electrolyte or a gel nonaqueous electrolyte.

7. The nonaqueous electrolyte secondary battery according to claim 1, wherein a resin layer is laminated on both sides of the metal layer.

8. The nonaqueous electrolyte secondary battery according to claim 1, wherein the pH of said positive electrode active material falls within a range of between 10.5 and 11.8.

9. A nonaqueous electrolyte secondary battery, comprising a jacket formed of a laminate film having a thickness of 0.2 mm or less and containing a metal layer and a resin layer laminated on one or both sides of the metal layer, a positive electrode housed in the jacket and containing a positive electrode active material, a negative electrode housed in the jacket and containing a negative electrode active material, and a nonaqueous electrolyte housed in the jacket and containing a nonaqueous solvent and a solute dissolved in the nonaqueous solvent, wherein said positive electrode active material comprises at least one kind of oxide selected from the group consisting of an oxide containing the elements M, Li and Ni and an oxide containing the elements M, Li, Ni and Co, wherein said element M being at least one element selected from the group consisting of Al, B, Sn and Nb, and said nonaqueous solvent contains at least 50% by volume of γ-butyrolactone, wherein the pH of said positive electrode active material falls within the range of between 10 and 12.

10. The nonaqueous electrolyte secondary battery according to claim 9, wherein the pH of said positive electrode active material falls within the range of between 10.5 and 11.8.

11. The nonaqueous electrolyte secondary battery according to claim 9, wherein said nonaqueous electrolyte is a liquid nonaqueous electrolyte or a gel nonaqueous electrolyte.

12. The nonaqueous electrolyte secondary battery according to claim 9, wherein said nonaqueous solvent further includes at least one kind of solvent selected from the group consisting of ethylene carbonate, propylene carbonate and vinylene carbonate.

13. The nonaqueous electrolyte secondary battery according to claim 9, wherein is laminated on both sides of the metal layer.

14. A nonaqueous electrolyte secondary battery, comprising a jacket formed of a laminate film having a thickness of 0.2 mm or less and containing a metal layer and a resin layer laminated on one or both sides of the metal layer, a positive electrode housed in the jacket and containing a positive electrode active material, a negative electrode housed in the jacket and containing at least one kind of carbon material selected from the group consisting of a fibrous carbon material, a spherical carbon material and a granular carbon material and a nonaqueous electrolyte housed in the jacket and containing a nonaqueous solvent and a solute dissolved in the nonaqueous solvent, wherein said positive electrode active material comprises at least one kind of oxide selected from the group consisting of an oxide containing the elements M, Li and Ni and an oxide containing the elements M, Li, Ni and Co, wherein said element M being at least one element selected from the group consisting of Al, B, Sn and Nb, and said nonaqueous solvent contains at least 50% by volume of γ-butyrolactone, wherein the pH of said positive electrode active material falls within the range of between 10 and 12.

15. The nonaqueous electrolyte secondary battery according to claim 14, wherein said carbon material is at least one of a carbonaceous material and a graphitized material.

16. The nonaqueous electrolyte secondary battery according to claim 14, wherein said fibrous carbon material has an average aspect ratio falling within a range of between 1.5 and 200.

17. The nonaqueous electrolyte secondary battery according to claim 14, wherein said granular carbon material has a ratio of the minor radius to the major radius falling within a range of between 1/100 and 1.

18. The nonaqueous electrolyte secondary battery according to claim 14, wherein said spherical carbon material has a ratio of the minor radius to the major radius being at least 1/10.

19. The nonaqueous electrolyte secondary battery according to claim 14, wherein the pH of said positive electrode active material falls within the range of between 10.5 and 11.8.

20. The nonaqueous electrolyte secondary battery according to claim 14, wherein a resin layer is laminated on both sides of the metal layer.

21. The nonaqueous electrolyte secondary battery according to claim 14, wherein said nonaqueous electrolyte is a liquid nonaqueous electrolyte or a gel nonaqueous electrolyte.

* * * * *